United States Patent
Wang et al.

(10) Patent No.: US 11,729,301 B2
(45) Date of Patent: *Aug. 15, 2023

(54) WIRELESS COMMUNICATION DEVICE AND CASE ASSEMBLY

(71) Applicant: HTC CORPORATION, Taoyuan (TW)

(72) Inventors: Chih-Kuang Wang, Taoyuan (TW); Chin Kai Sun, Taoyuan (TW); Chun-Lung Chu, Taoyuan (TW); Tung-Hsin Yeh, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/396,918

(22) Filed: Aug. 9, 2021

(65) Prior Publication Data
US 2021/0392212 A1 Dec. 16, 2021

Related U.S. Application Data

(63) Continuation of application No. 16/897,438, filed on Jun. 10, 2020, now Pat. No. 11,115,508.

(51) Int. Cl.
*H04M 1/02* (2006.01)

(52) U.S. Cl.
CPC ................ *H04M 1/0202* (2013.01)

(58) Field of Classification Search
CPC .. H04M 1/0202; H04M 1/0249; H04M 1/026; H04M 1/18; H01Q 1/243
See application file for complete search history.

(56) References Cited

U.S. PATENT DOCUMENTS

| | | | |
|---|---|---|---|
| 9,232,031 B1 | 1/2016 | Shoval et al. | |
| 10,164,679 B1 | 12/2018 | Rajagopalan et al. | |
| 11,115,508 B1 * | 9/2021 | Wang | H04M 1/0202 |
| 11,258,163 B2 * | 2/2022 | Froese | H01Q 13/10 |
| 2007/0155445 A1 | 7/2007 | Cho | |
| 2008/0316117 A1 | 12/2008 | Hill et al. | |

(Continued)

FOREIGN PATENT DOCUMENTS

| | | |
|---|---|---|
| CN | 106450680 B | 3/2019 |
| TW | 201438545 A | 10/2014 |
| WO | WO2018141193 A1 | 8/2018 |

*Primary Examiner* — Kenneth T Lam
(74) *Attorney, Agent, or Firm* — Muncy, Geissler, Olds & Lowe, P.C.

(57) ABSTRACT

A case assembly and a wireless communication device are provided. The case assembly includes a metal case and a plastic cladding body. The metal case includes an inner side and an outer side, the inner side is opposite to the outer side, the metal case includes a hollow portion and an antenna portion, the hollow portion is adjacent to a side of the antenna portion. The plastic cladding body is disposed on the metal case, and completely covers the outer side of the metal case, partially covers the inner side of the metal case, and fills the hollow portion. The wireless communication device includes a case assembly and a radio frequency signal module. The radio frequency signal module is electrically connected to the antenna portion of the case assembly. Thus, the structural rigidity of the wireless communication device and its case assembly is kept, and the production cost is reduced.

10 Claims, 7 Drawing Sheets

(56) References Cited

U.S. PATENT DOCUMENTS

| | | |
|---|---|---|
| 2011/0186345 A1 | 8/2011 | Pakula et al. |
| 2012/0262347 A1* | 10/2012 | Tiang ..................... H01Q 1/243 |
| | | 343/702 |
| 2013/0017864 A1 | 1/2013 | Allore et al. |
| 2015/0050968 A1 | 2/2015 | Jeon et al. |
| 2016/0233573 A1* | 8/2016 | Son ........................ H01Q 1/243 |
| 2018/0069588 A1 | 3/2018 | Jiang et al. |
| 2018/0278730 A1* | 9/2018 | Saeed ................ G06Q 20/3224 |
| 2019/0260861 A1 | 8/2019 | Wang et al. |

* cited by examiner

WIRELESS COMMUNICATION DEVICE AND CASE ASSEMBLY

CROSS REFERENCE TO RELATED APPLICATIONS

The present invention is a Continuation of U.S. patent application Ser. No. 16/897,438, filed on Jun. 10, 2020, now U.S. Pat. No. 11,115,508, the entirety of which is hereby incorporated by reference in their entireties.

BACKGROUND OF THE INVENTION

Field of the Invention

The present invention relates to a wireless communication device and a case assembly, and in particular, relates to a case assembly and a wireless communication device comprising metal and plastic.

Descriptions of the Related Art

With the vigorous development of science and technology industries, people's demands for various kinds of wireless communication have increased, and thus more antennas for transmitting and receiving wireless signals are required in electronic products.

Antennas in an electronic product (or called a wireless communication device) are mostly arranged inside a case, and in order to avoid poor reception of signals caused by shielding wireless signals (electromagnetic waves), the case is often made of plastic or glass. However, the durability and structural strength of plastic or glass case are poor, and it is easy to be damaged due to external impact. On the other hand, a case made of metal is also available, and the case has better durability and structural strength. In order to avoid blocking wireless signals, the metal case has a hollow area at the position corresponding to the antennas, and then the hollow area will be filled with plastic.

Figure 1A:
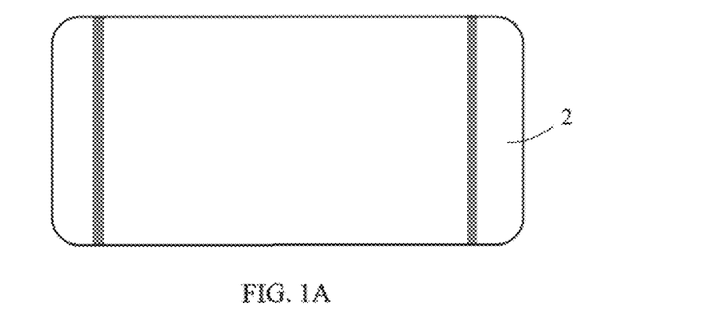
FIG. 1A and FIG. 1B are respectively schematic views of an outer side and an inner side of a conventional case assembly.
Figure 1B:
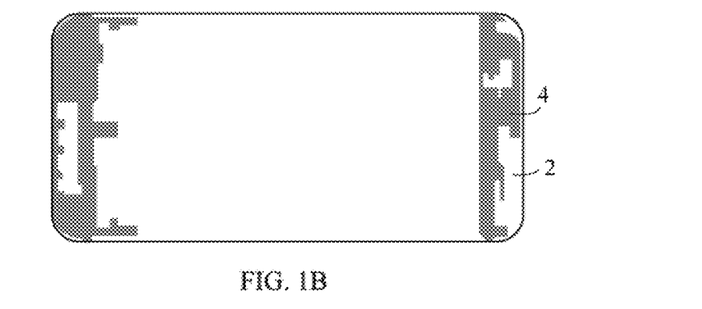
Figure 1C:
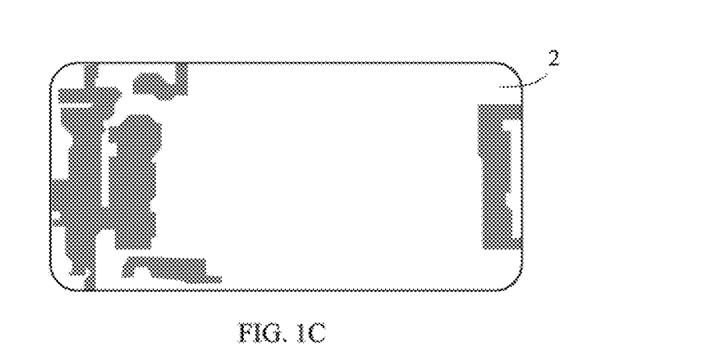
FIG. 1C and FIG. 1D are respectively schematic views of an outer side and an inner side of another conventional case assembly.
Figure 1D:
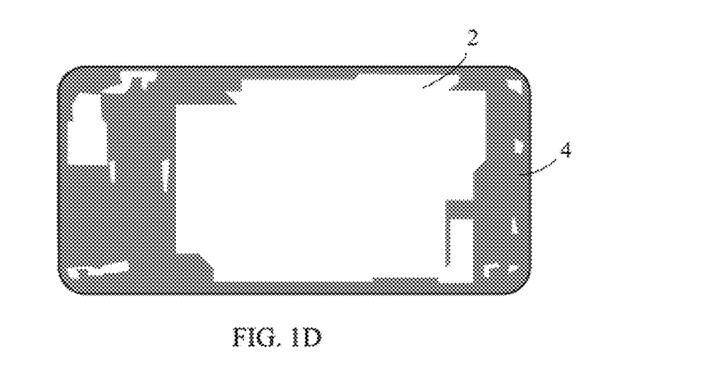

However, as shown in FIG. 1A and FIG. 1B, mismatch occurs to the connection interface between the metal case 2 and the plastic 4 (the gray part in the figure) due to different material characteristics of the metal and the plastic (such as shrinkage and smoothness), which results in an unpleasant appearance. Therefore, additional grinding and other processes are needed to make the interface between the metal case 2 and the plastic 4 smooth. However, as shown in FIG. 1C and FIG. 1D, once the number of antennas increases, the hollowed-out area of the metal case will also be increased, which results in a larger interface of a complicated shape between the metal case 2 and the plastic 4, and this further makes it a big problem for the design of the appearance to match the antenna configuration. Furthermore, more grinding processes are required in order to improve or eliminate the interface mismatch between the metal case 2 and the plastic 4, and even more painting processes are needed in order to make the metal case 2 have a smooth appearance and sense of touch. These additional processes will undoubtedly increase the production cost.

Accordingly, there is still a need to improve the wireless communication device and the case assembly thereof.

It shall be additionally appreciated that, the above technical content is used to facilitate understanding of the problem to be solved by the present invention, which is not necessarily disclosed or known in the art.

SUMMARY OF THE INVENTION

An objective of the present invention is to provide a wireless communication device and a case assembly. Although the case assembly has an interface of metal and plastic, it can reduce the use of grinding and other processes to improve the interface mismatch and thus reduce the production cost. In addition, a part of the case assembly can also be used as an antenna to transmit and receive wireless signals.

To achieve the aforesaid objective, a case assembly provided by the present invention comprises a metal case and a plastic cladding body. The metal case comprises an inner side and an outer side, the inner side is opposite to the outer side, the metal case comprises a hollow portion and an antenna portion, and the hollow portion is adjacent to a side of the antenna portion. The plastic cladding body is disposed on the metal case, completely covers the outer side of the metal case, partially covers the inner side of the metal case, and fills in the hollow portion.

A wireless communication device provided by the present invention may comprise a case assembly and a radio frequency signal module. The case assembly comprises a metal case and a plastic cladding body. The metal case comprises an inner side and an outer side, the inner side is opposite to the outer side, the metal case comprises a hollow portion and an antenna portion, and the hollow portion is disposed at a side of the antenna portion. The plastic cladding body is disposed on the metal case, and completely covers the outer side of the metal case, partially covers the inner side of the metal case, and fills in the hollow portion. The radio frequency signal module may be electrically connected to the antenna portion of the case assembly.

In an embodiment, a material interface of the metal case and the plastic cladding body is disposed on the inner side of the metal case or in the hollow portion.

In an embodiment, the plastic cladding body fills the hollow portion up, or the plastic cladding body is thinner than the metal case.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Hereinafter, specific embodiments according to the present invention will be specifically described. However, the present invention may be practiced in many different forms of embodiments without departing from the spirit of the present invention, and the scope claimed in the present invention should not be interpreted as being limited to what stated in the specification.

Unless the context clearly indicates otherwise, singular forms "a" and "an" as used herein also include plural forms, and terms "first", "second" or the like are used herein to describe various elements or components, and do not indicate that the elements or components need to have necessary order or priority. In addition, the orientations (such as front, back, upper, lower, both sides, inside and outside, etc.) are relative orientations, which may be defined according to the use state of the wireless communication device or the case assembly, and do not indicate or imply that the wireless communication device or the case assembly needs to be constructed or operated in a specific direction, and the orientations should not be understood as limitation to the present invention.

The case assembly of the present invention is adapted for use in a wireless communication device, and the wireless communication device may be an electronic product capable of performing wireless communication, such as a mobile phone, a tablet computer, a notebook computer, and a network sharer. The case assembly may comprise a back cover portion, a shell portion and a frame portion of the wireless communication device. The inner side of the case assembly faces the internal elements of the wireless communication device and thus cannot be viewed by the user. The user can only observe or touch an outer side of the case assembly. In the following description, the technical content of each component will be explained by taking a mobile phone as an example, without being limited thereto. In addition, the wireless communication device may be a device capable of transmitting and receiving millimeter waves, suitable for use in the fifth generation mobile communication system and the wireless charging technology.

Figure 2A:
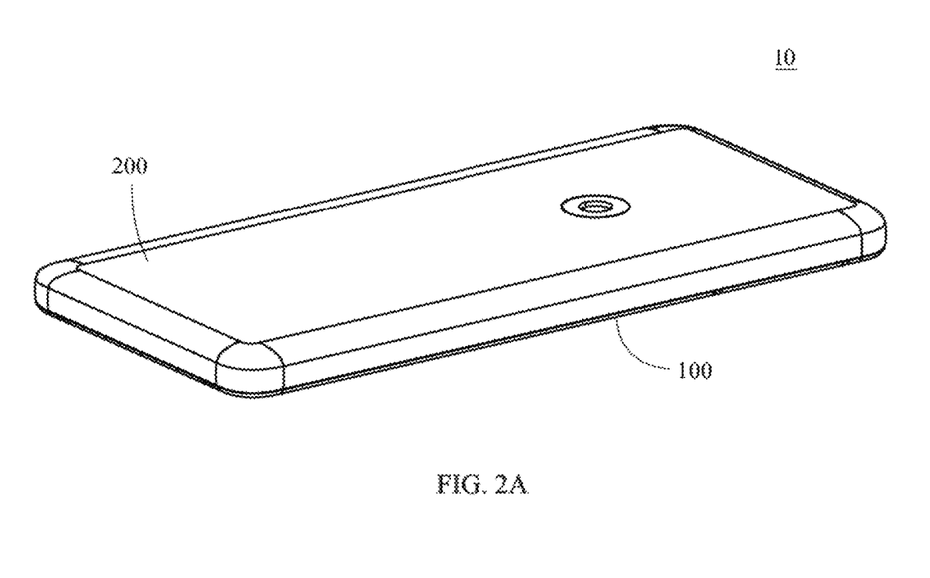
FIG. 2A, FIG. 2B and FIG. 2C are respectively a perspective view and exploded views of a case assembly according to a preferred embodiment of the present invention.
Figure 2B:
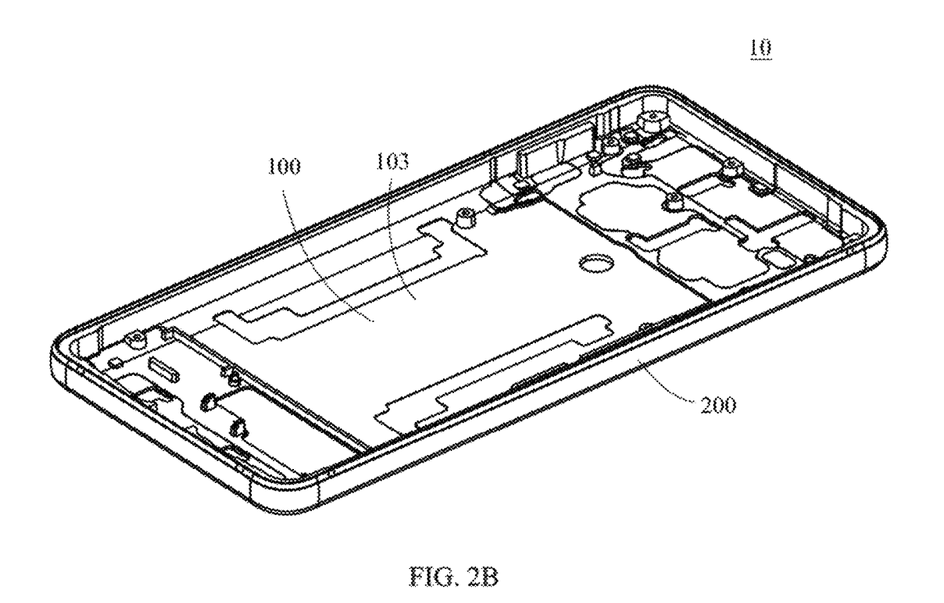
Figure 2C:
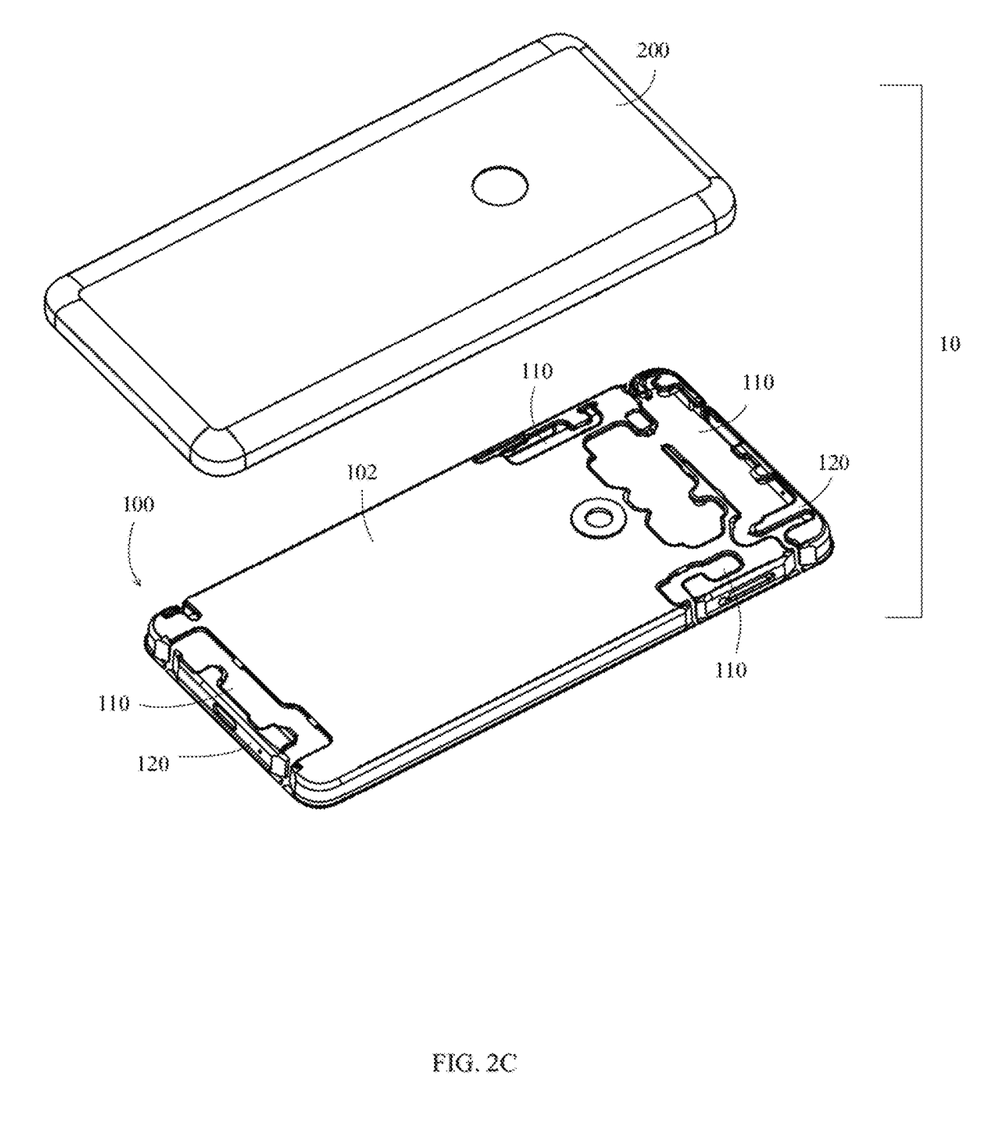

Please refer to FIG. 2A to FIG. 2C, which are a perspective view and exploded views of a case assembly 10 according to a preferred embodiment of the present invention. The case assembly 10 may comprise a metal case 100 and a plastic cladding body 200, and the technical contents of the elements are sequentially described as follows.

Figure 3A:
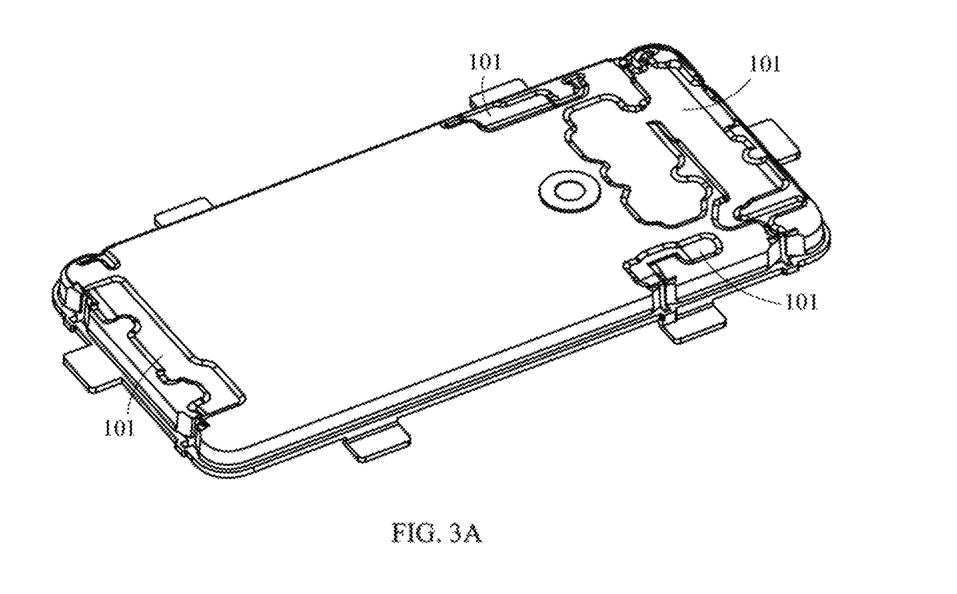
FIG. 3A to FIG. 3C are schematic views illustrating a manufacturing process of a metal case of a case assembly according to a preferred embodiment of the present invention.
Figure 3B:
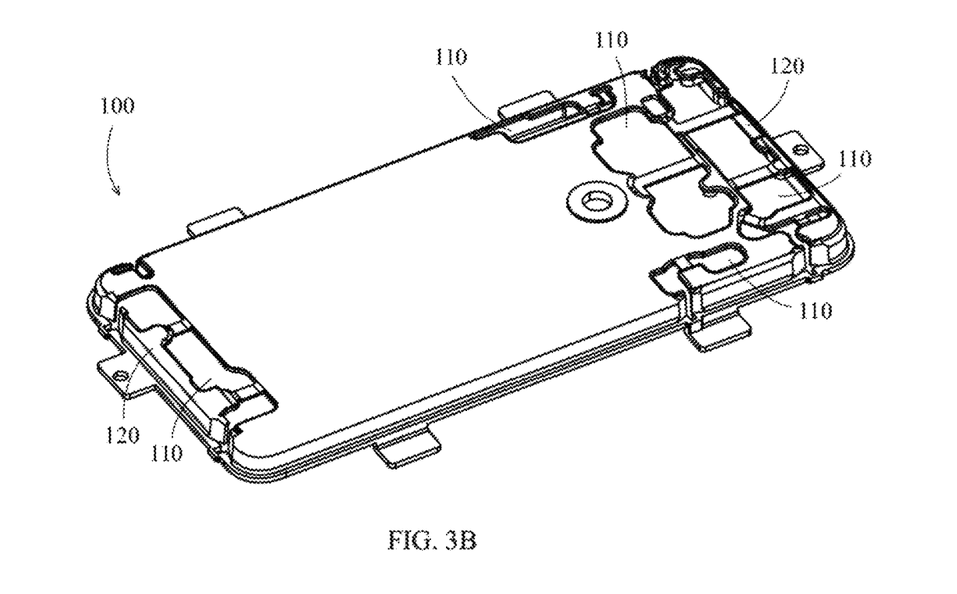
Figure 3C:
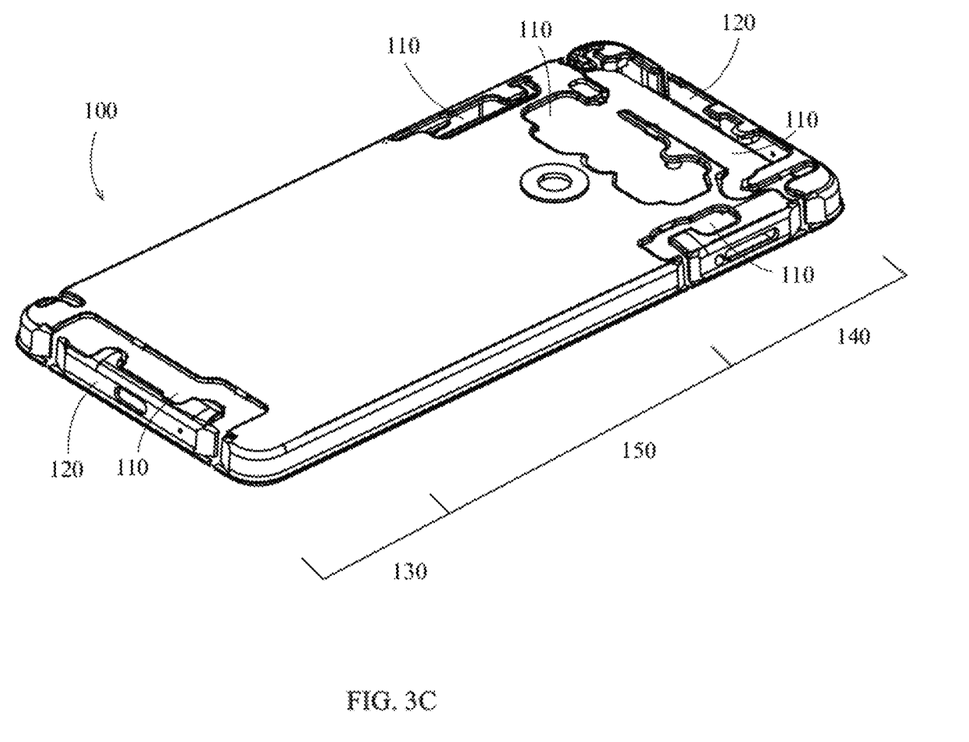

Please refer to FIG. 3A to FIG. 3C together, which are schematic views of a manufacturing process of the metal case 100. The metal case 100 may be a lid body formed by die casting a metal material or a lid body formed by stamping a metal plate. The lid body may comprise a plurality of recesses 101 (as shown in FIG. 3A). Then, the lid body is cut or die-cut to remove the metal at the recess 101 of the lid body (as shown in FIG. 3B and FIG. 3C). The manufactured metal case 100 comprises at least one hollow portion 110 and at least one antenna portion 120, wherein the hollow portion 110 corresponds to the metal removed portion at the recess 101, and the antenna portion 120 corresponds to the metal portion aside the recess 101 where the metal is removed. The antenna portion 120 may be immediately adjacent to the hollow portion 110. The shape of the hollow portion 110 may be correspondingly adjusted according to the shape and radiation path required for the antenna portion 120. That is, the shape and radiation path required for the antenna portion 120 are designed in advance, and then the required antenna portion 120 is obtained by using the hollow portion 110, i.e., a part of the metal case 100 forms the antenna portion 120. The hollow portion 110 may also be formed in response to other purposes, such as reducing the weight of the metal case 100 or not shielding the radiation of other antennas (not shown) in the wireless communication device.

Furthermore, as shown in FIG. 3C, the metal case 100 may comprise a first region 130, a second region 140 and a third region 150, and the third region 150 is located between the first region 130 and the second region 140. For example, a plurality of hollow portions 110 may be respectively arranged in the first region 130 (lower side) and the second region 140 (upper side), and have different shapes and sizes, e.g., closed holes and/or open holes extending through one side of the metal case 100. The hollow portion 110 in the second region 140 may be larger than the hollow portion 110 in the first region 130. Likewise, a plurality of antenna portions 120 may be respectively arranged in the first region 130 and the second region 140, and preferably, the antenna portions 120 constitute the side portions (an upper side portion or a lower side portion) of the metal case 100, e.g., frames at upper and lower sides. As such, it is less likely to block the antenna portion 120 from transmitting and receiving wireless signals when the user operates the wireless communication device. According to different design methods of the antenna portion 120, the position, shape or size of the hollow portion 110 and the antenna portion 120 may all be adjusted.

Except for the hollow portion 110 and the antenna portion 120, other portions of the metal case 100 may make the whole case assembly 10 have sufficient structural rigidity and strength, thereby providing a better protective effect for the wireless communication device (the mobile phone).

Next, the plastic cladding body 200, which is disposed on the metal case 100, will be described. Further speaking, after the metal case 100 comprises the hollow portion 110 and the antenna portion 120 by cutting or die-cutting, the plastic cladding body 200 is formed on the metal case 100, e.g., a plastic (a raw material of the plastic cladding body 200) is formed on the metal case 100 by overmolding or insert molding. The plastic cladding body 200 may completely cover an outer side 102 of the metal case 100, and meanwhile fill in the hollow portion 110, and then partly cover an inner side 103 of the metal case 100. Therefore, in the direction of the outer side 102, the user can only observe and touch the plastic cladding body 200, but cannot observe and touch the outer side 102. However, in the direction of the inner side 103, the user can observe and touch the plastic cladding body 200 and the inner side 103 at the same time.

Figure 4A:
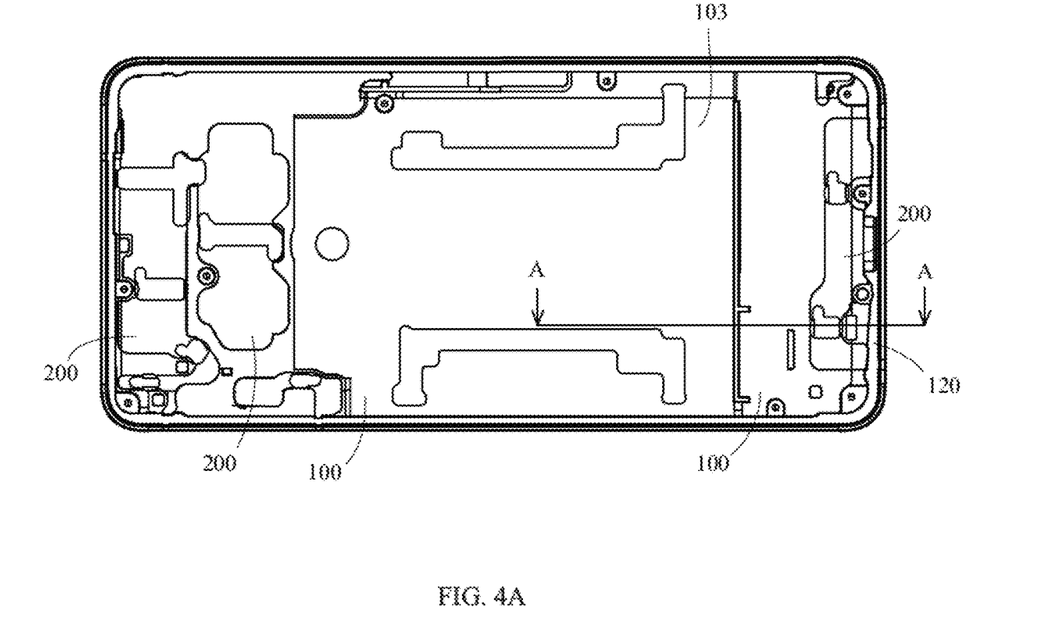
FIG. 4A is an inside view of a case assembly according to a preferred embodiment of the present invention.
Figure 4B:
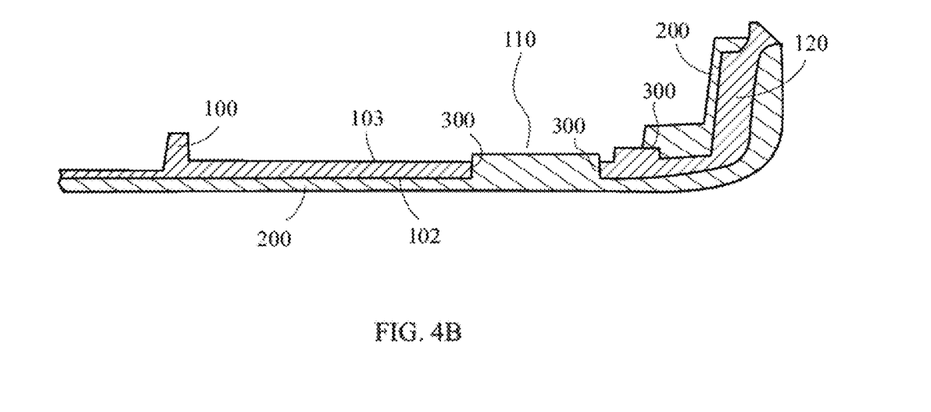
FIG. 4B is a partial cross-sectional schematic view of the case assembly taken along a line A-A in FIG. 4A.

Please refer to FIG. 4A to FIG. 4B, which are respectively an inside view and a cross-sectional view of the case assembly 10. When the plastic cladding body 200 fills in the hollow portion 110, it may only fill a portion of the hollow portion 110 (the thickness of a portion of the plastic cladding body 200 in the hollow portion 110 is less than the depth of the hollow portion 110), or completely fill up the hollow portion 110 (the thickness is the same as the depth), or further cover the inner side 103 of the metal case 100 (the thickness is greater than the depth). In this way, a material interface 300 between the metal case 100 and the plastic cladding body 200 will be located on the inner side 103 of the metal case 100 or in the hollow portion 110, and the material interface 300 will not be located on or exposed to the outer side 102 of the metal case 100. As shown in FIG. 2A, when the case assembly 10 is combined with other components of the wireless communication device, the user will not see or touch the material interface 300 from the outside of the case assembly 10.

Since the material interface 300 cannot be seen or touched from the outside, even if mismatch occurs to the material interface 300 between the metal case 100 and the plastic cladding body 200, the appearance of the case assembly 10 will not be affected. In other words, it may be unnecessary to eliminate or hide the mismatch by performing processes such as polishing or painting. As compared to the conventional metal case, the production cost of the case assembly 10 can be reduced.

On the other hand, since the main purpose of the plastic cladding body 200 is not to increase the structural rigidity or strength of the case assembly 10, the plastic cladding body 200 as a whole is unnecessary to be too thick. Preferably, the plastic cladding body 200 may be thinner than the metal case 100, as long as it is sufficient to cover the outer side 102 of the metal case 100 and fill the hollow portion 110. For example, the thickness of the plastic cladding body 200 may be between 0.5 mm and 0.45 mm. In this way, the overall thickness of the case assembly 10 (the sum of the thickness of the metal case 100 and the thickness of the plastic cladding body 200) is not significantly different from that of a general metal case.

Figure 5:
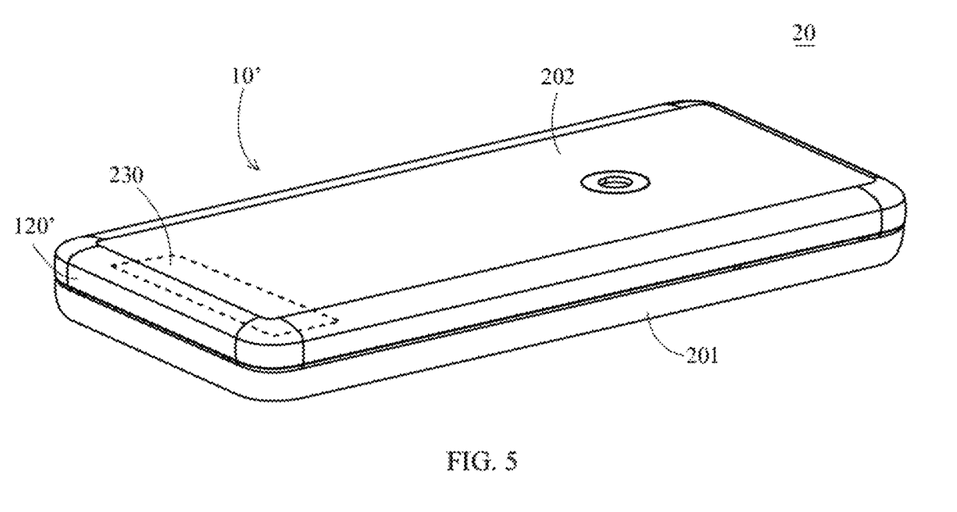
FIG. 5 is a schematic view of a wireless communication device according to a preferred embodiment of the present invention.

Please refer to FIG. 5, which is a schematic perspective view of a wireless communication device 20 according to another preferred embodiment of the present invention. The wireless communication device 20 comprises a case assembly 10' and a radio frequency signal module 230. The wireless communication device 20 may comprise a display portion 201 and a back portion 202. The display portion 201 may comprise a display screen of the wireless communication device and related elements arranged on the side of the display portion 201, and may also comprise a part of the frame, while the back portion 202 is opposite to the display portion 201 and may comprise the case assembly 10'. Reference may be made to the case assembly 10 of the above embodiment for the technical content of the case assembly 10'. An accommodating space may be formed by combining the display portion 201 with the back portion 202, and the accommodating space may be used for accommodating other elements, such as a microprocessor, a battery, a circuit board, and electronic components. The radio frequency signal module (or called a radio frequency control module) 230 is disposed in the aforesaid accommodating space, and may be electrically connected with the antenna portion 120' of the case assembly 10' and other elements such as the processor in the wireless communication device 20 (e.g., electrically connected through a flexible wire, a flat cable or a circuit board). The radio frequency signal module 230 is mainly used for processing radio frequency signals transmitted and received by the antenna module (the antenna module comprises the antenna portion 120' of the case assembly 10' and other antennas in the wireless communication device 20), such as conversion between radio frequency signals and digital signals, power amplification or the like. The radio frequency signal module 230 may comprise one or more chips, and may also comprise an impedance matching circuit, and may be further integrated with electronic components related to other functions in one chip.

According to the above descriptions, the case assembly of the present invention may have the structural rigidity and strength of a metal case and a smooth appearance of a plastic case, and may also be used as an antenna. In addition, the appearance of the case assembly will not be affected by the mismatch occurring to the material interface between the metal and the plastic, and thus a process for processing the mismatch can be omitted and the production cost can be reduced. The case assembly may be used in a wireless communication device as a component of the wireless communication device.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A case assembly, comprising:
   a metal case, comprising an inner side and an outer side, the inner side is opposite to the outer side, and comprising a hollow portion and an antenna portion, the hollow portion is adjacent to a side of the antenna portion; and
   a plastic cladding body, disposed on the metal case, completely covering the outer side of the metal case, partially filling in the hollow portion and forming a smooth appearance of a wireless communication device;
   wherein a material interface of the metal case and the plastic cladding body is disposed in the hollow portion or on the inner side of the metal case; and
   wherein the metal case comprises a first region, a second region and a third region, and the third region is located between the first region and the second region, and the hollow portion is arranged in the first region and/or the second region, and the hollow portion is a closed hole or an open hole extending through one side of the metal case.

2. The case assembly according to claim 1, wherein the plastic cladding body is further partially covering the inner side of the metal case.

3. The case assembly according to claim 1, wherein the plastic cladding body fills the hollow portion up.

4. The case assembly according to claim 1, wherein the plastic cladding body is thinner than the metal case.

5. The case assembly according to claim 1, further comprising a plurality of antenna portions, wherein the antenna portions are respectively arranged in the first region and the second region.

6. The case assembly according to claim 5, wherein the antenna portions constitute the side portions of the metal case.

7. A wireless communication device, comprising:
   a case assembly, comprising a metal case and a plastic cladding body, wherein the metal case comprises an inner side and an outer side, the inner side is opposite to the outer side, and the metal case comprises a hollow portion and an antenna portion, the hollow portion is adjacent to a side of the antenna portion, the plastic cladding body is disposed on the metal case, and completely covers the outer side of the metal case, partially fills in the hollow portion and forming a smooth appearance of the wireless communication device; and
   a radio frequency signal module, electrically connected to the antenna portion of the case assembly;
   wherein a material interface of the metal case and the plastic cladding body is disposed in the hollow portion or on the inner side of the metal case; and
   wherein the metal case comprises a first region, a second region and a third region, and the third region is located between the first region and the second region, and the hollow portion is arranged in the first region and/or the second region, and the hollow portion is a closed hole or an open hole extending through one side of the metal case.

8. The wireless communication device according to claim 7, wherein the plastic cladding body fills the hollow portion up.

9. The wireless communication device according to claim 8, wherein the plastic cladding body is further partially covering the inner side of the metal case.

10. The wireless communication device according to claim 9, wherein the plastic cladding body is thinner than the metal case.

\* \* \* \* \*